(12) United States Patent
Siomina et al.

(10) Patent No.: US 12,167,376 B2
(45) Date of Patent: Dec. 10, 2024

(54) FLEXIBLE CONFIGURATIONS OF CHANNEL OCCUPANCY MEASUREMENTS

(71) Applicant: Telefonaktiebolaget LM Ericsson (publ), Stockholm (SE)

(72) Inventors: Iana Siomina, Täby (SE); Peter Alriksson, Hörby (SE); Stephen Grant, Pleasanton, CA (US); Havish Koorapaty, Saratoga, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 296 days.

(21) Appl. No.: 17/635,630

(22) PCT Filed: Aug. 14, 2020

(86) PCT No.: PCT/EP2020/072936
§ 371 (c)(1),
(2) Date: Feb. 15, 2022

(87) PCT Pub. No.: WO2021/032649
PCT Pub. Date: Feb. 25, 2021

(65) Prior Publication Data
US 2022/0295465 A1  Sep. 15, 2022

Related U.S. Application Data

(60) Provisional application No. 62/888,200, filed on Aug. 16, 2019.

(51) Int. Cl.
*H04W 72/044* (2023.01)
*H04W 16/14* (2009.01)
(Continued)

(52) U.S. Cl.
CPC ......... *H04W 72/044* (2013.01); *H04W 74/08* (2013.01)

(58) Field of Classification Search
CPC ... H04W 72/044; H04W 74/08; H04W 16/14; H04W 24/10; H04W 72/0446; H04W 72/0453; H04W 74/0808
See application file for complete search history.

(56) References Cited

U.S. PATENT DOCUMENTS

2016/0302230 A1   10/2016   Novlan et al.
2016/0338118 A1   11/2016   Vajapeyam et al.
(Continued)

FOREIGN PATENT DOCUMENTS

WO   2020017928 A1   1/2020

OTHER PUBLICATIONS

International Search Report and Written Opinion dated Oct. 29, 2020 for International Application No. PCT/EP2020/072936 filed Aug. 14, 2020, consisting of 20-pages.
(Continued)

*Primary Examiner* — Harry H Kim
(74) *Attorney, Agent, or Firm* — Weisberg I.P. Law, P.A.

(57) ABSTRACT

A method, network node and wireless device for flexible configuration of channel occupancy measurements in New Radio (NR) are disclosed. According to one aspect, a wireless device configured to communicate with a network node is provided. The wireless device includes processing circuitry configured to: determine a time-domain configuration for a channel occupancy measurement based on at least one configuration parameter where the time-domain (Continued)

configuration is independent of subcarrier spacing of at least one carrier on which the channel occupancy measurement is performed; and optionally perform the channel occupancy measurement based at least on the determined time-domain configuration.

20 Claims, 7 Drawing Sheets

(51) Int. Cl.
    *H04W 24/10*     (2009.01)
    *H04W 72/0446*     (2023.01)
    *H04W 72/0453*     (2023.01)
    *H04W 74/08*     (2024.01)
    *H04W 74/0808*     (2024.01)

(56) References Cited

U.S. PATENT DOCUMENTS

| | | | | |
|---|---|---|---|---|
| 2018/0049006 A1* | 2/2018 | Hong | ............... | H04L 67/60 |
| 2019/0149252 A1 | 5/2019 | Siomina et al. | | |
| 2019/0223224 A1* | 7/2019 | Park | ............... | H04W 74/006 |
| 2020/0329494 A1* | 10/2020 | Mondal | ............. | H04W 74/0808 |
| 2020/0351705 A1* | 11/2020 | Chae | ............... | H04W 72/52 |
| 2023/0189020 A1* | 6/2023 | Calcev | ............. | H04W 74/0816 |
| | | | | 370/329 |

OTHER PUBLICATIONS

3GPP TSG-RAN WG4 Meeting #92 R4-1909464; Title: On RSSI and channel occupancy for NR-U; Agenda Item: 9.1.5.9; Source: Ericsson; Document for: Discussion; Date and Location: Aug. 26-30, 2019, Ljubljana, Slovenia, consisting of 3-pages.

3GPP TSG-RAN WG4 Meeting #92-Bis R4-1912359; Title: On RSSI and channel occupancy measurements in NR-U; Agenda Item: 8.1.4.11; Source: Qualcomm Incorporated; Document for: Discussion; Date and Location: Oct. 14-18, 2019, Chongqing, China, consisting of 7-pages.

3GPP TR 38.889 V16.0.0; 3rd Generation Partnership Project; Technical Specification Group Radio Access Network; Study on NR-based access to unlicensed spectrum (Release 16); Dec. 2018, consisting of 119-pages.

3GPP TS 36.331 V15.6.0; 3rd Generation Partnership Project; Technical Specification Group Radio Access Network; Evolved Universal Terrestrial Radio Access (E-UTRA); Radio Resource Control (RRC); Protocol specification (Release 15); Jun. 2019, consisting of 960-pages.

* cited by examiner

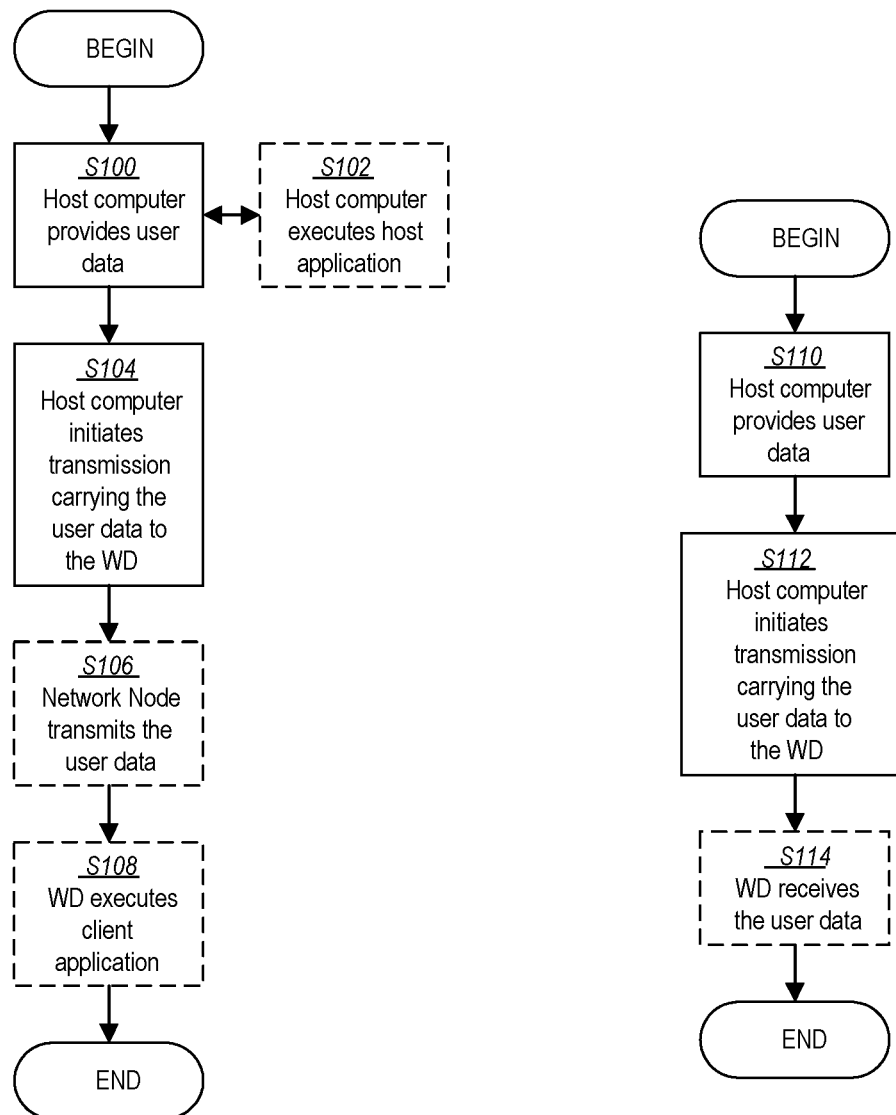

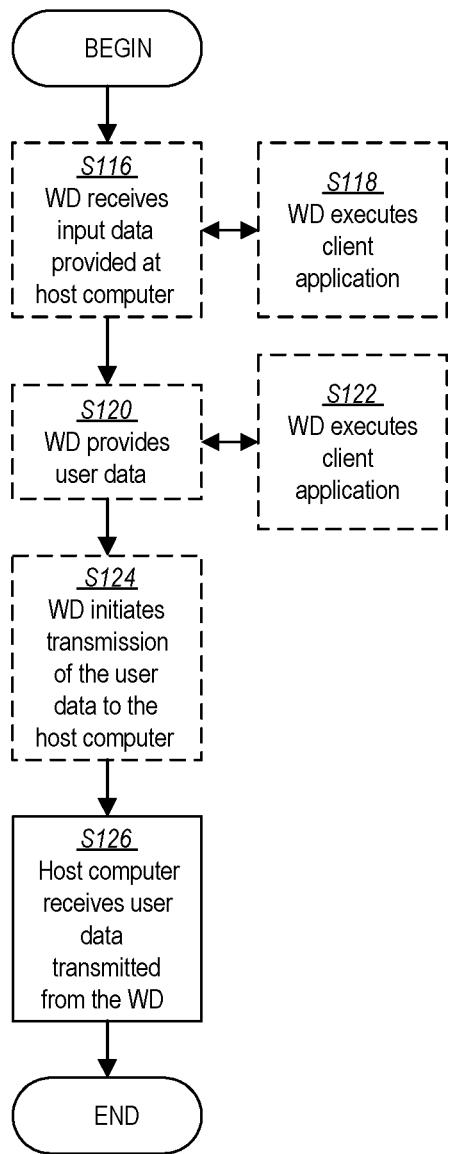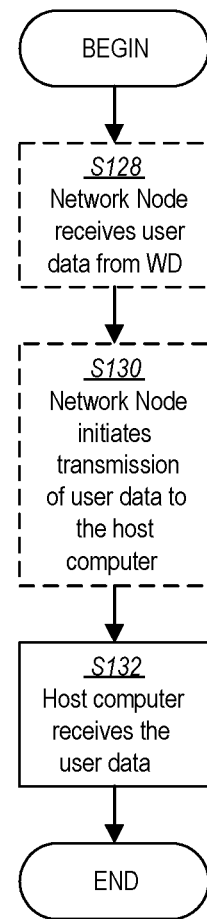
FIG. 6
FIG. 7

FLEXIBLE CONFIGURATIONS OF CHANNEL OCCUPANCY MEASUREMENTS

CROSS-REFERENCE TO RELATED APPLICATIONS

This application is a Submission Under 35 U.S.C. § 371 for U.S. National Stage Patent Application of International Application No.: PCT/EP2020/072936, filed Aug. 14, 2020 entitled "FLEXIBLE CONFIGURATION OF CHANNEL OCCUPANCY MEASUREMENTS," which claims priority to U.S. Provisional Application No. 62/888,200, filed Aug. 16, 2019, entitled "METHODS FOR FLEXIBLE CONFIGURATION OF CHANNEL OCCUPANCY MEASUREMENTS IN NEW RADIO," the entireties of both of which are incorporated herein by reference.

TECHNICAL FIELD

The present disclosure relates to wireless communications, and in particular, to methods for flexible configuration of channel occupancy measurements, for example in New Radio (NR) also known as 5th Generation (5G).

BACKGROUND

NR-U (New Radio Unlicensed or NR in Unlicensed Spectrum)

Some parts of the radio spectrum have become potentially available for license-assisted access (LAA) to unlicensed operation. This spectrum can be used by operators to augment their service offerings in licensed bands by being operated under a license-exempt regime or Industrial Scientific and Medical (ISM) radio bands, but must be shared with existing mobile services and other incumbent services. During the NR-U study Item in the $3^{rd}$ Generation Partnership Project (3GPP), different unlicensed bands or shared bands have been further discussed, such as 2.4 GHz band, 3.5 GHz band, 5 GHz band, and 6 GHz band.

For channel access in Long Term Evolution (LTE)-LAA, a Listen Before Talk (LBT) mechanism is adopted as a baseline for the 5 GHz band and adopted as the starting point of the design for the 6 GHz band. At least for bands where the absence of Wi-Fi cannot be guaranteed (e.g., by regulation), LBT can be performed in units of 20 MHz.

During LBT, the transmitting node determines whether there are no other transmissions (by performing certain measurements and comparing to a threshold) and if so, the transmitting node starts COT (Channel Occupancy Time) which does not exceed MCOT (maximum COT can vary by regions). Otherwise, the transmitting node seizes its transmissions for a certain time and may retry again later. However, unlike in LTE, there are more LBT categories in NR and for some categories (Cat2), there are also 16 μs Cat2 and 25 μs Cat2 LBT types, depending on the switching time between uplink (UL) and downlink (DL) (16 μs Cat2 means switching longer than 16 μs but shorter than 25 μs, and 25 μs Cat2 means 25 or longer). In addition, there is also a concept of wireless device (WD) transmitting based on LBT procedure during base station (BS)-initiated COT (shared COT).

Similar to LTE, NR-U is expected to have DRS (discovery reference signals) or similar, e.g., to enable initial access and measurements. LTE DRS contains only primary synchronization signal (PSS)/secondary synchronization signal (SSS)/cell specific reference signal (CRS), but NR DRS may comprise more signals and/or channels.

Channel Access Schemes

FIG. 1 is a diagram showing an example of LTE LBT and COT, where "s" is the sensing time period. In FIG. 1, if the channel is determined to be busy, after some deferral time the WD may try again to sense on the channel in order to determine whether the channel is available, and if so after some deterministic backoff time the WD may start transmitting uplink (UL) burst (during the WD's channel occupancy time) but for no longer than the maximum channel occupancy time (MCOT) which can be, e.g., up to 10 ms, depending on the region.

The channel access schemes for NR-based access for unlicensed spectrum can be classified into the following categories:

a) Category 1 (Cat 1): Immediate transmission after a short switching gap;
b) Category 2 (Cat 2): LBT without random back-off—like in LTE;
c) Category 3 (Cat 3): LBT with random back-off with a contention window of fixed size; and
d) Category 4 (Cat 4): LBT with random back-off with a contention window of variable size.

For different transmissions in a COT and different channels and/or signals to be transmitted, different categories of channel access schemes can be used. The applicability of the channel access schemes is described, e.g., in 3GPP Technical Release (TR) 38.889.

Channel access mechanisms for beamformed transmissions have been studied. It has been determined that omnidirectional LBT should be supported. Using directional LBT for beamformed transmissions, i.e., LBT performed in the direction of the transmitted beam has also been studied. Further consideration is pending regarding directional LBT and its benefits for beamformed transmissions when the specifications are to be developed, considering regulations and fair co-existence with other technologies.

RSSI Measurements in LTE LAA

In LTE, evolved Universal Mobile Telecommunication System (UMTS) Terrestrial Radio Access (E-UTRA) Received Signal Strength Indicator (RSSI) measurements were introduced for LAA and defined as the linear average of the total received power (in Watts) observed only in the configured orthogonal frequency division multiplexed (OFDM) symbols and in the measurement bandwidth over a pre-defined (6) number of resource blocks, by the WD from all sources, including co-channel serving and non-serving cells, adjacent channel interference, thermal noise, etc.

Higher open system interconnection (OSI) layers indicate the measurement duration and which OFDM symbol(s) should be measured by the WD. Namely, the RSSI is configured (for example according to 3GPP Technical Standard (TS) 36.331) by means of the following information element (IE) in MeasObjectEUTRA: rmtc-Period, rmtc-SubframeOffset, and measDuration, so the WD performs RSSI measurements during measDuration only within periodic RSSI Measurement Timing Configuration (RMTC) occasions. RSSI measurements are configured for a serving cell frequency or a neighbor cell frequency.

UE reports rssi-Result as the average of sample value(s) provided by lower layers in the reportInterval.

```
RMTC-Config-r13 ::= CHOICE {
    release                         NULL,
    setup                           SEQUENCE {
        rmtc-Period-r13             ENUMERATED
{ms40, ms80, ms160, ms320, ms640},
        rmtc-SubframeOffset-r13     INTEGER(0..639)
            OPTIONAL,               -- Need ON
        measDuration-r13            ENUMERATED {sym1,
sym14, sym28, sym42, sym70},
        ...
    }
}
``` rmtc-Period
Indicates the RSSI measurement timing configuration (RMTC) periodicity for this frequency.
Value ms40 corresponds to 40 ms periodicity, ms80 corresponds to 80 ms periodicity and so on.
rmtc-SubframeOffset
Indicates the RSSI measurement timing configuration (RMTC) subframe offset for this frequency. The value of rmtc-SubframeOffset should be smaller than the value of rmtc-Period. For inter-frequency measurements, this field is optionally present and if it is not configured, the WD chooses a random value as rmtc-SubframeOffset for measDuration which shall be selected to be between 0 and the configured rmtc-Period with equal probability.
measDuration
Number of consecutive symbols for which the Physical Layer reports samples of RSSI. Value sym1 corresponds to one symbol, sym14 corresponds to 14 symbols, and so on.

The reported values are in:

```
MeasResultForRSSI-r13 ::=SEQUENCE {
    rssi-Result-r13RSSI-Range-r13,
    channelOccupancy-r13INTEGER (0..100),
    ...
}
```

Channel Occupancy in LTE LAA

The WD estimates the channel occupancy on one or more carrier frequencies indicated by higher layers, based on RSSI samples provided by the physical layer, according to the RSSI configuration. The channel occupancy is evaluated by comparing RSSI samples to the configured channelOccupancyThreshold.

The channel occupancy measurement period corresponds to max(reportInterval, rmtc-Period), UE reports the channelOccupancy as the rounded percentage of sample values which are beyond to the channelOccupancyThreshold within all the sample values in the reportInterval RSSI measurement configurations in LTE may not be directly adapted to NR due to many parameters that determine the NR physical layer configuration, e.g., numerology (which was assumed to be fixed in LAA), etc.

SUMMARY

Some embodiments advantageously provide methods, network nodes and wireless devices for methods for flexible configuration of channel occupancy measurements in New Radio.

Methods and devices for configuring channel occupancy measurements in NR are disclosed herein. Some embodiments may have one or more of the following advantages:
  a) Possibility to flexibly configure channel occupancy measurements in NR; and
  b) Possibility to perform channel occupancy measurements according to a new configuration.

According to one aspect of the disclosure, a wireless device configured to communicate with a network node is provided. The wireless device includes processing circuitry configured to: determine a time-domain configuration for a channel occupancy measurement based on at least one configuration parameter where the time-domain configuration is independent of subcarrier spacing of at least one carrier on which the channel occupancy measurement is performed, and optionally perform the channel occupancy measurement based at least on the determined time-domain configuration.

According to one or more embodiments of this aspect, the processing circuitry is further configured to determine a frequency-domain configuration for the channel occupancy measurement based on the at least one configuration parameter where the frequency-domain configuration is independent of subcarrier spacing of at least one carrier on which the channel occupancy measurement is performed. The channel occupancy measurement is performed based at least on the determined frequency-domain configuration. According to one or more embodiments of this aspect, the frequency-domain configuration indicates a frequency in a measurement bandwidth of the channel occupancy measurement. According to one or more embodiments of this aspect, the indicated frequency in the of the measurement bandwidth corresponds to a center frequency of the measurement bandwidth.

According to one or more embodiments of this aspect, the time-domain configuration indicates a measurement duration for the channel occupancy measurement. According to one or more embodiments of this aspect, the at least one configuration parameter includes a reference numerology, the time-domain configuration is indicated in terms of a quantity of symbols based on the reference numerology. According to one or more embodiments of this aspect, the time-domain configuration provides a granularity of measurement for the channel occupancy measurement.

According to one or more embodiments of this aspect, the processing circuitry is further configured to receive the at least one configuration parameter from a network node. According to one or more embodiments of this aspect, the processing circuitry is further configured to report the channel occupancy measurement, the channel measurement being a received signal strength indicator, RSSI, measurement. According to one or more embodiments of this aspect, the RSSI measurement is scaled with a first bandwidth. According to one or more embodiments of this aspect, the at least one configuration parameter is configured to be applied to at least one of multiple subband and bandwidth parts, BWPs.

According to another aspect of the disclosure, a network node configured to communicate with a wireless device is provided. The network node includes processing circuitry configured to: cause transmission of at least one configuration parameter that is configured to indicate a time-domain configuration for a channel occupancy measurement where the time-domain configuration is independent of subcarrier spacing of at least one carrier on which the channel occupancy measurement is performed, and optionally receive the channel occupancy measurement that is associated with the at least one configuration parameter.

According to one or more embodiments of this aspect, the at least one configuration parameter is further configured to indicate a frequency-domain configuration for the channel occupancy measurement where the frequency-domain configuration is independent of subcarrier spacing of at least one carrier on which the channel occupancy measurement is performed. According to one or more embodiments of this aspect, the frequency-domain configuration is configured to indicate a frequency in a measurement bandwidth of the channel occupancy measurement.

According to one or more embodiments of this aspect, the indicated frequency in the of the measurement bandwidth corresponds to a center frequency of the measurement bandwidth. According to one or more embodiments of this aspect, the time-domain configuration is configured to indicate a measurement duration for the channel occupancy measurement. According to one or more embodiments of this aspect, the at least one configuration parameter includes a reference numerology, the time-domain configuration is indicated in terms of a quantity of symbols based on the reference numerology.

According to one or more embodiments of this aspect, the time-domain configuration is configured to provide a granularity of measurement for the channel occupancy measurement. According to one or more embodiments of this aspect, the channel measurement is a received signal strength indicator, RSSI, measurement. According to one or more embodiments of this aspect, the RSSI measurement is scaled with a first bandwidth. According to one or more embodiments of this aspect, the at least one configuration parameter is configured to be applied to at least one of multiple subband and bandwidth parts, BWPs. According to one or more embodiments of this aspect, the processing circuitry is configured to: receive a neighbor channel occupancy measurement from another network node; and adjust scheduling associated with the wireless device based on the neighbor channel occupancy measurement.

According to another aspect of the disclosure, a method implemented by a wireless device that is configured to communicate with a network node is provided. A time-domain configuration for a channel occupancy measurement is determined based on at least one configuration parameter where the time-domain configuration is independent of subcarrier spacing of at least one carrier on which the channel occupancy measurement is performed. The channel occupancy measurement is optionally performed based at least on the determined time-domain configuration.

According to one or more embodiments of this aspect, a frequency-domain configuration for the channel occupancy measurement is determined based on the at least one configuration parameter where the frequency-domain configuration is independent of subcarrier spacing of at least one carrier on which the channel occupancy measurement is performed. The channel occupancy measurement is performed based at least on the determined frequency-domain configuration. According to one or more embodiments of this aspect, the frequency-domain configuration indicates a frequency in a measurement bandwidth of the channel occupancy measurement. According to one or more embodiments of this aspect, the indicated frequency in the of the measurement bandwidth corresponds to a center frequency of the measurement bandwidth.

According to one or more embodiments of this aspect, the time-domain configuration indicates a measurement duration for the channel occupancy measurement. According to one or more embodiments of this aspect, the at least one configuration parameter includes a reference numerology where the time-domain configuration is indicated in terms of a quantity of symbols based on the reference numerology. According to one or more embodiments of this aspect, the time-domain configuration provides a granularity of measurement for the channel occupancy measurement.

According to one or more embodiments of this aspect, the at least one configuration parameter is received from a network node. According to one or more embodiments of this aspect, the channel occupancy measurement is reported where the channel measurement being a received signal strength indicator, RSSI, measurement. According to one or more embodiments of this aspect, the RSSI measurement is scaled with a first bandwidth. According to one or more embodiments of this aspect, the at least one configuration parameter is configured to be applied to at least one of multiple subband and bandwidth parts, BWPs.

According to another aspect of the disclosure, a method implemented by a network node that is configured to communicate with a wireless device is provided. Transmission is caused of at least one configuration parameter that is configured to indicate a time-domain configuration for a channel occupancy measurement where the time-domain configuration is independent of subcarrier spacing of at least one carrier on which the channel occupancy measurement is performed. The channel occupancy measurement that is associated with the at least one configuration parameter is optionally received.

According to one or more embodiments of this aspect, the at least one configuration parameter is further configured to indicate a frequency-domain configuration for the channel occupancy measurement, the frequency-domain configuration being independent of subcarrier spacing of at least one carrier on which the channel occupancy measurement is performed. According to one or more embodiments of this aspect, the frequency-domain configuration is configured to indicate a frequency in a measurement bandwidth of the channel occupancy measurement. According to one or more embodiments of this aspect, the indicated frequency in the of the measurement bandwidth corresponds to a center frequency of the measurement bandwidth.

According to one or more embodiments of this aspect, the time-domain configuration is configured to indicate a measurement duration for the channel occupancy measurement. According to one or more embodiments of this aspect, the at least one configuration parameter includes a reference numerology, the time-domain configuration is indicated in terms of a quantity of symbols based on the reference numerology. According to one or more embodiments of this aspect, the time-domain configuration is configured to provide a granularity of measurement for the channel occupancy measurement.

According to one or more embodiments of this aspect, the channel measurement is a received signal strength indicator, RSSI, measurement. According to one or more embodiments of this aspect, the RSSI measurement is scaled with a first bandwidth. According to one or more embodiments of this aspect, the at least one configuration parameter is configured to be applied to at least one of multiple subband and bandwidth parts, BWPs. According to one or more embodiments of this aspect, a neighbor channel occupancy measurement is received from another network node, and scheduling associated with the wireless device is adjusted based on the neighbor channel occupancy measurement.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a flowchart illustrating example methods implemented in a communication system including a host computer, a network node and a wireless device for executing a client application at a wireless device according to some embodiments of the present disclosure;

FIG. 5 is a flowchart illustrating example methods implemented in a communication system including a host computer, a network node and a wireless device for receiving user data at a wireless device according to some embodiments of the present disclosure;

FIG. 6 is a flowchart illustrating example methods implemented in a communication system including a host computer, a network node and a wireless device for receiving user data from the wireless device at a host computer according to some embodiments of the present disclosure;

FIG. 7 is a flowchart illustrating example methods implemented in a communication system including a host computer, a network node and a wireless device for receiving user data at a host computer according to some embodiments of the present disclosure;

DETAILED DESCRIPTION

Figure 1:
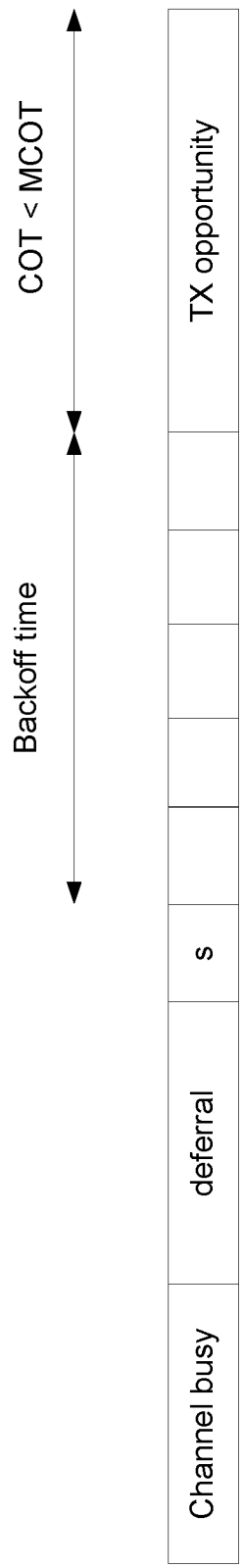
FIG. 1 is diagram of an example of LTE LBT and COT.

Before describing in detail example embodiments, it is noted that the embodiments reside primarily in combinations of apparatus components and processing steps related to methods for flexible configuration of channel occupancy measurements in New Radio. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Other Terminology

In some embodiments, a more general term "network node" is used and it can correspond to any type of radio network node or any network node, which communicates with a WD and/or with another network node. Examples of network nodes are radio network node, gNodeB (gNB), ng-eNB, base station (BS), NR base station, TRP (transmission reception point), multi-standard radio (MSR) radio node such as MSR BS, network controller, radio network controller (RNC), base station controller (BSC), relay, access point (AP), transmission points, transmission nodes, RRU, RRH, nodes in distributed antenna system (DAS), core network node (e.g. MSC, MME, etc), O&M, OSS, SON, positioning node or location server (e.g. E-SMLC), MDT, test equipment (physical node or software), etc. A radio network node is network node capable of transmitting radio signals, e.g., base station, gNB, etc.

In some embodiments the non-limiting term user equipment (UE) or wireless device (WD) is used and it refers to any type of wireless device communicating with a network node and/or with another WD in a cellular or mobile communication system. Examples of WD are wireless device supporting NR, target device, device to device (D2D) WD, machine type WD or WD capable of machine to machine (M2M) communication, PDA, PAD, Tablet, mobile terminals, smart phone, laptop embedded equipped (LEE), laptop mounted equipment (LME), drone, USB dongles, ProSe WD, V2V WD, V2X WD, etc.

The term "radio node" may refer to radio network node or WD capable of transmitting radio signals or receiving radio signals or both.

The term time resource used herein may correspond to any type of physical resource or radio resource expressed in terms of length of time or time interval or time duration. Examples of time resources include: symbol, mini-slot, time slot, subframe, radio frame, TTI, interleaving time, etc.

The term transmission time interval (TTI) used herein may correspond to any time period over which a physical channel can be encoded and interleaved for transmission. The physical channel is decoded by the receiver over the same time period (T0) over which it was encoded. The TTI may also interchangeably called as short TTI (sTTI), transmission time, slot, sub-slot, mini-slot, short subframe (SSF), mini-subframe etc.

Unless explicitly stated, the term LBT used herein may comprise DL LBT, UL LBT, or both. DL LBT may be performed by a radio network node, while UL LBT may be performed by a WD. Hence generically speaking LBT may be performed by a radio node. The term "LBT category" or "LBT type" refers to a set of parameters characterizing LBT procedure, including but not limited to: LBT categories, LBT with different switching delays between UL and DL (e.g., up to 16 µs, longer than 16 but shorter than 25, or 25 µs and above), beam-based LBT (LBT in a specific direction) or omni-directional LBT, different LBT approaches in frequency domain (e.g., subband-specific, wideband LBT over multiple contiguous subbands, wideband LBT over multiple non-contiguous subbands, etc.), LBT with or without shared COT (shared COT is e.g. when the COT is initiated by gNB and the transmitting within the COT without performing LBT), single-subband or multi-subband or wideband LBT.

The term "COT configuration" may comprise one or more parameters characterizing the beginning of COT, length of COT, end of COT, carrier frequencies for which the COT is applicable, shared or not shared COT, fixed-length COT or variable-length COT, etc.

The term DRS is used herein to refer to one or more signals transmitted by a radio network node. DRS may comprise, e.g., SSB (defined in TS 38.133), PSS/SSS, PBCH, CSI-RS, RMSI-CORESET(s), RMSI-PDSCH(s), OSI, paging, etc.

The term channel occupancy measurement used herein may comprise a measurement or evaluation result indicative of the occupancy of the associated resources. Some non-limiting examples of channel occupancy measurements are RSSI measurements or similar measurements, channel occupancy evaluation result based on RSSI samples versus a configured threshold, percentage or ratio of RSSI samples meeting a certain condition (e.g., above a threshold), channel occupancy ratio, other measurement or metric based on RSSI samples, etc.

The embodiments are described for NR-U. However the embodiments are applicable to any other radio access technology (RAT) or multi-RAT systems, where a WD receives and/or transmit signals (e.g. data) e.g. NR, LTE frequency division duplex (FDD)/time division duplex (TDD), LTE LAA and its enhancements, WCDMA/HSPA, WiFi, WLAN, LTE, 5G, any NR (standalone or non-standalone), etc. The embodiments may be applicable to other RATs in which symbol length and/or subcarrier spacing is not fixed.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A method, network node and wireless device for flexible configuration of channel occupancy measurements in New Radio (NR) are disclosed. According to one aspect, a method implemented in a wireless device (WD) may include determining a numerology-independent measurement parameter for a channel occupancy measurement and determining a channel occupancy measurement configuration based on the determined numerology-independent measurement parameter. This and other aspects will be described in more detail below.

Figure 2:
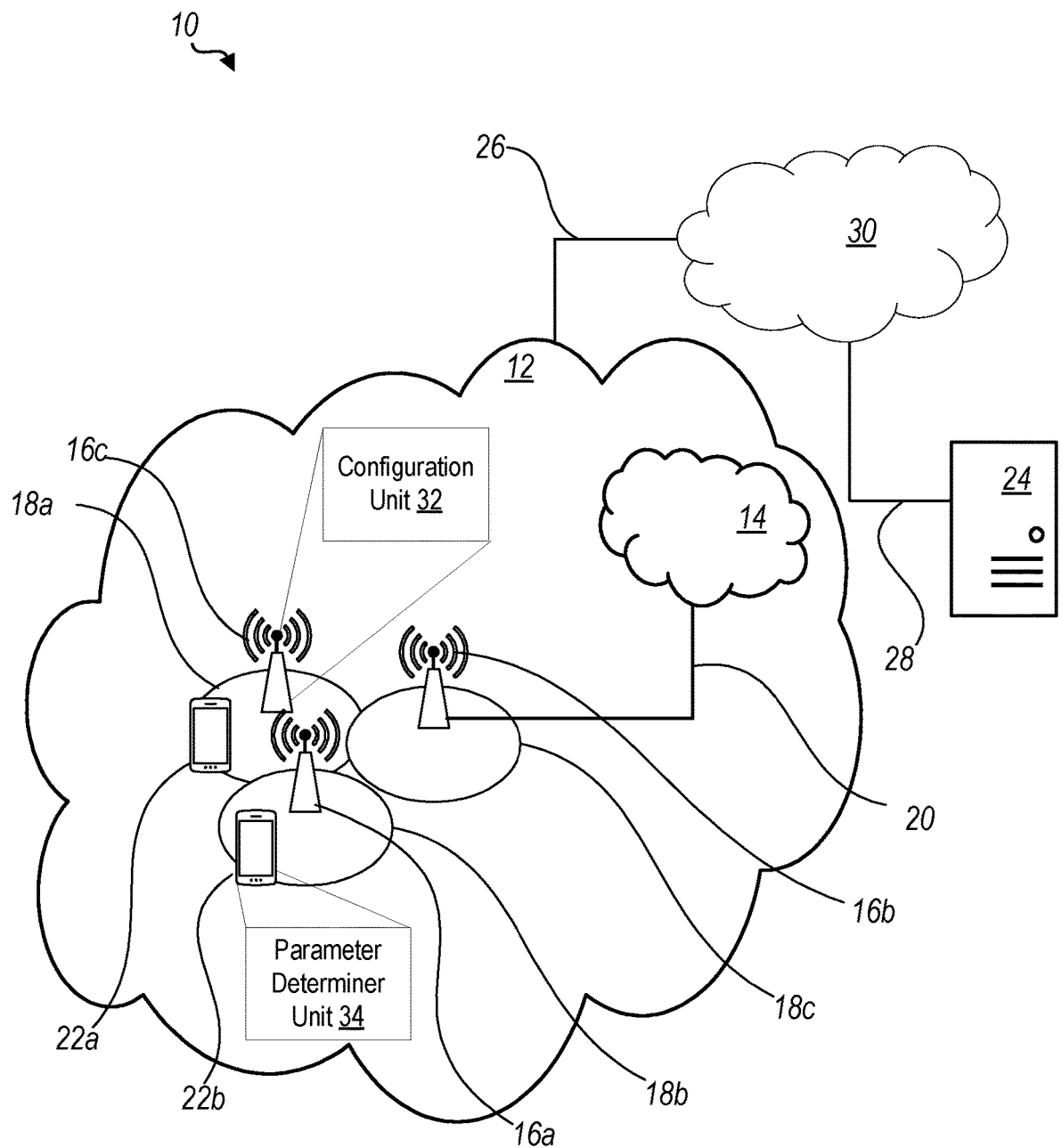
FIG. 2 is a schematic diagram of an example network architecture illustrating a communication system connected via an intermediate network to a host computer according to the principles in the present disclosure.

Returning now to the drawing figures, in which like elements are referred to by like reference designators, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 configured to configure the WD 22 for channel occupancy measurements, the configuring including configuring time and/or frequency resources for the channel occupancy measurements. The wireless device 22 is configured to include a parameter determiner unit 34 which is configured to determine a numerology-independent measurement parameter for a channel occupancy measurement.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to configure the WD 22 for channel occupancy measurements, the configuring including configuring time and/or frequency resources for the channel occupancy measurements.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include parameter determiner unit 34 which is configured to determine a numerology-independent measurement parameter for a channel occupancy measurement.

Figure 3:
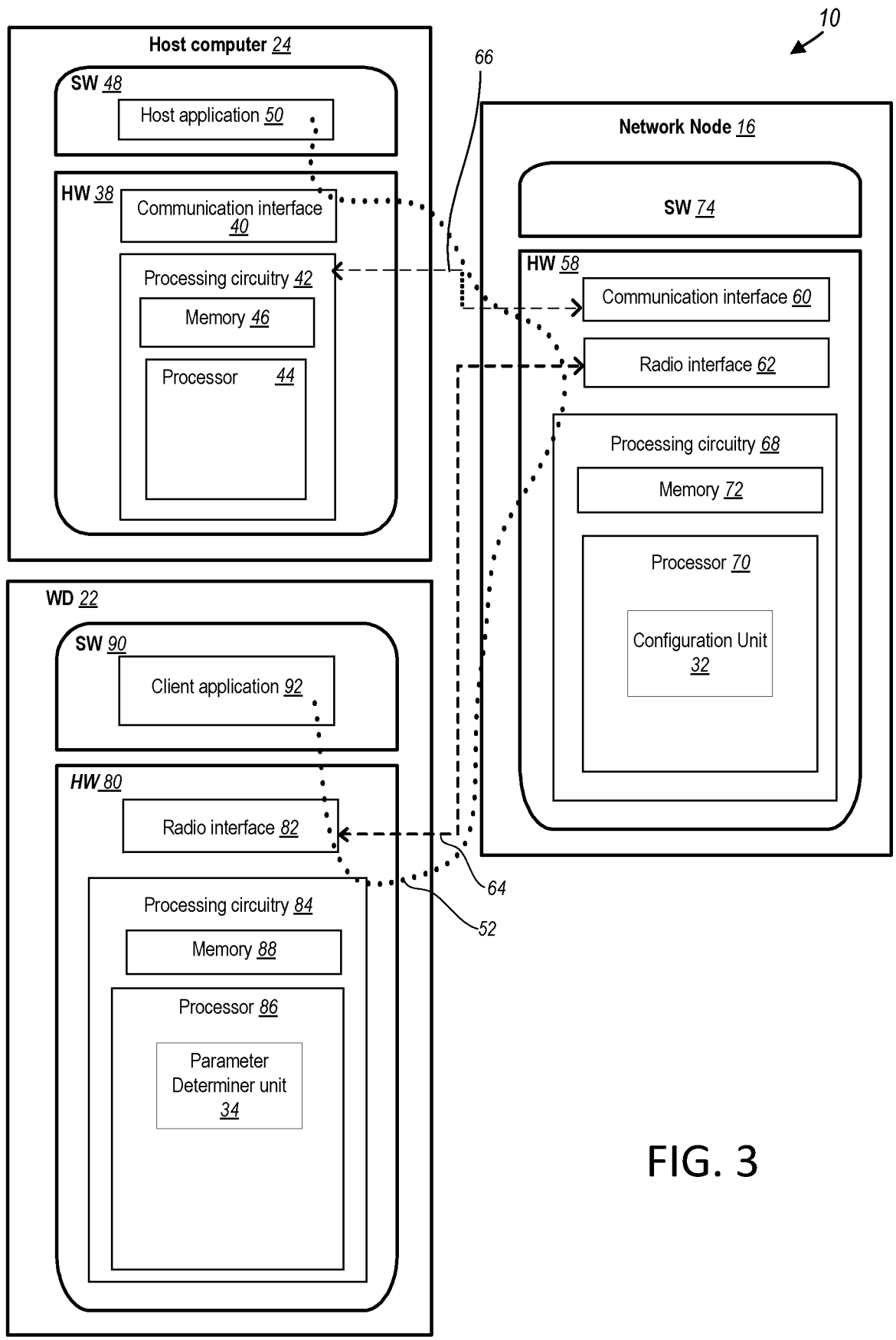
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62.

In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as configuration unit 32, and parameter determiner unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 4 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 6 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally, or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
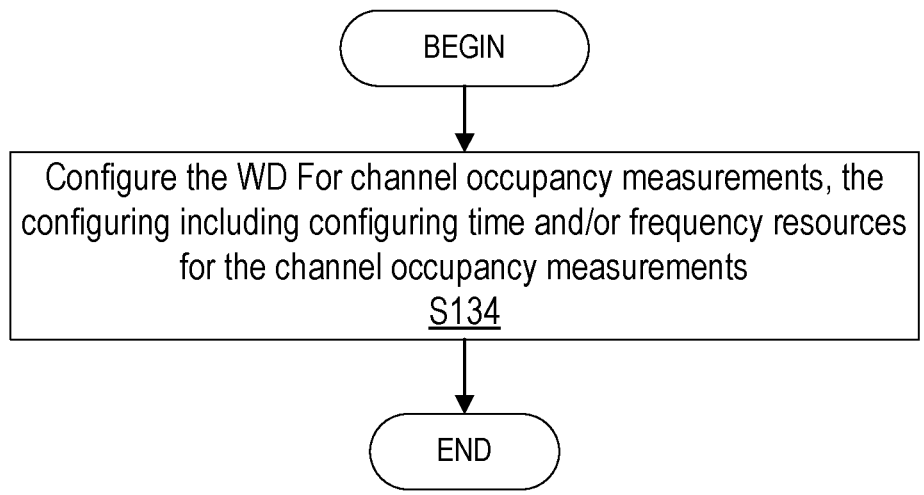
FIG. 8 is a flowchart of an example process in a network node according to some embodiments of the present disclosure.

FIG. 8 is a flowchart of an exemplary process in a network node 16 according to some embodiments of the present disclosure. One or more blocks described herein may be performed by one or more elements of network node 16 such as by one or more of processing circuitry 68 (including the configuration unit 32), processor 70, radio interface 62 and/or communication interface 60. Network node 16 such as via processing circuitry 68 and/or processor 70 and/or radio interface 62 and/or communication interface 60 is configured to configure the WD for channel occupancy measurements, the configuring including configuring time and/or frequency resources for the channel occupancy measurements (Block S134).

Figure 9:
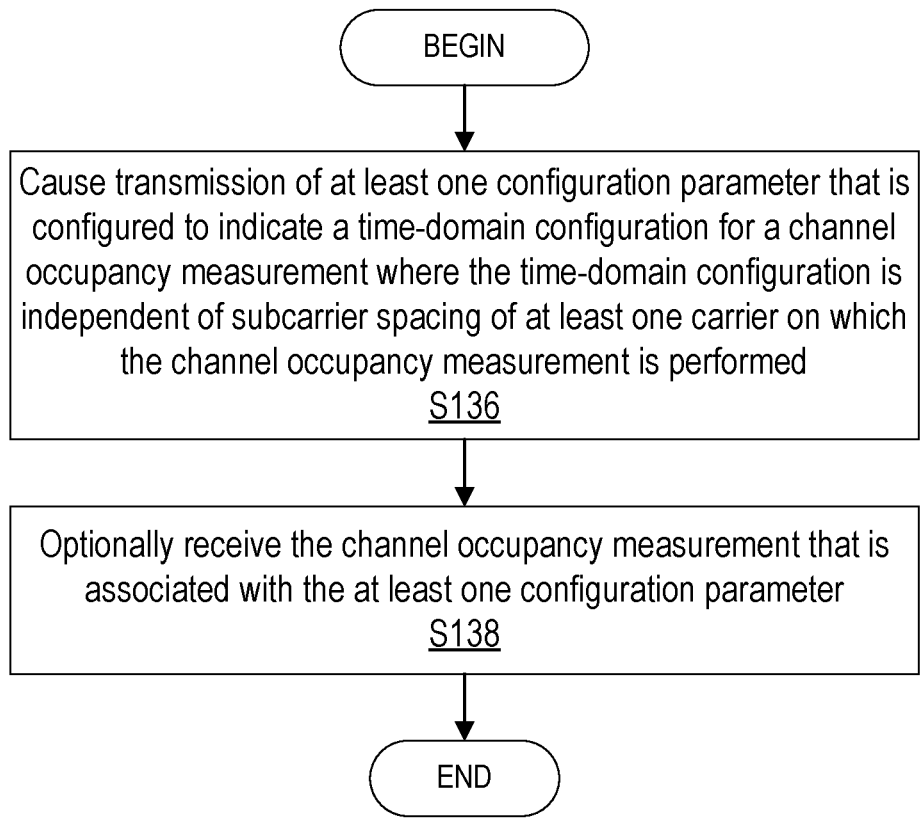
FIG. 9 is a flowchart of another example process in a network node according to some embodiments of the present disclosure.

FIG. 9 is a flowchart of an exemplary process in a network node 16 according to some embodiments of the present disclosure. One or more blocks described herein may be performed by one or more elements of network node 16 such as by one or more of processing circuitry 68 (including the configuration unit 32), processor 70, radio interface 62 and/or communication interface 60. Network node 16 such as via processing circuitry 68 and/or processor 70 and/or radio interface 62 and/or communication interface 60 is configured to cause (Block S136) transmission of at least one configuration parameter that is configured to indicate a time-domain configuration for a channel occupancy measurement where the time-domain configuration is independent of subcarrier spacing of at least one carrier on which the channel occupancy measurement is performed, as described herein. Network node 16 such as via processing circuitry 68 and/or processor 70 and/or radio interface 62 and/or communication interface 60 is configured to optionally receive (Block S138) the channel occupancy measurement that is associated with the at least one configuration parameter, as described herein.

According to one or more embodiments, the at least one configuration parameter is further configured to indicate a frequency-domain configuration for the channel occupancy measurement where the frequency-domain configuration is independent of subcarrier spacing of at least one carrier on which the channel occupancy measurement is performed. According to one or more embodiments, the frequency-domain configuration is configured to indicate a frequency in a measurement bandwidth of the channel occupancy measurement. According to one or more embodiments, the indicated frequency in the of the measurement bandwidth corresponds to a center frequency of the measurement bandwidth.

According to one or more embodiments, the time-domain configuration is configured to indicate a measurement duration for the channel occupancy measurement. According to one or more embodiments, the at least one configuration parameter includes a reference numerology, the time-domain configuration is indicated in terms of a quantity of symbols based on the reference numerology. According to one or more embodiments, the time-domain configuration is configured to provide a granularity of measurement for the channel occupancy measurement.

According to one or more embodiments, the channel measurement is a received signal strength indicator, RSSI, measurement. According to one or more embodiments, the RSSI measurement is scaled with a first bandwidth. According to one or more embodiments, the at least one configuration parameter is configured to be applied to at least one of multiple subband and bandwidth parts, BWPs. According to one or more embodiments, the processing circuitry 68 is configured to: receive a neighbor channel occupancy measurement from another network node; and adjust scheduling associated with the wireless device based on the neighbor channel occupancy measurement.

Figure 10:
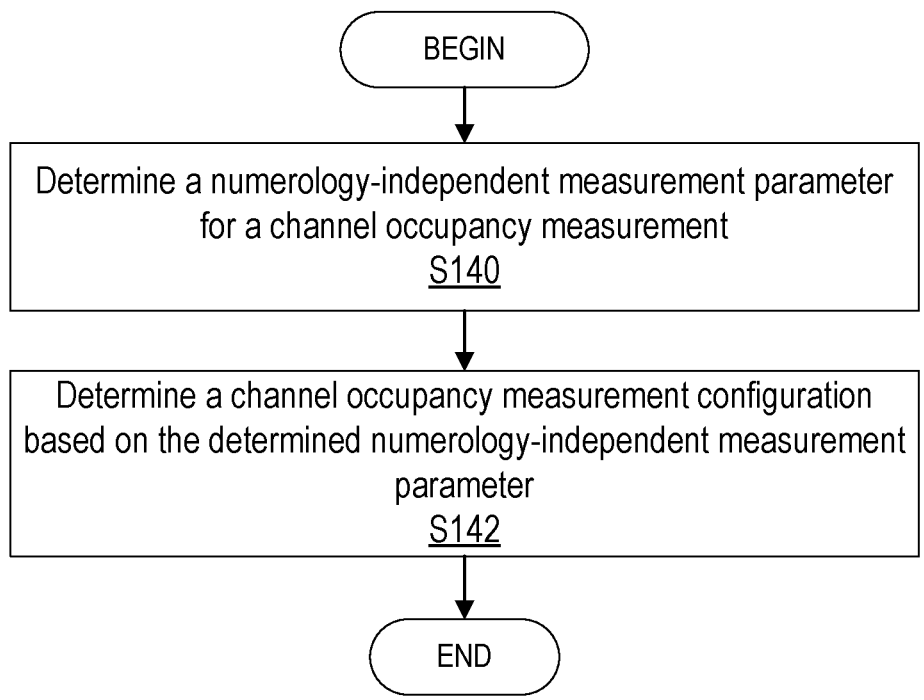
FIG. 10 is a flowchart of an example process in a wireless device according to some embodiments of the present disclosure.

FIG. 10 is a flowchart of an exemplary process in a wireless device 22 according to some embodiments of the present disclosure. One or more blocks described herein may be performed by one or more elements of wireless device 22 such as by one or more of processing circuitry 84 (including the parameter determiner unit 34), processor 86, radio interface 82 and/or communication interface 60. Wireless device 22 such as via processing circuitry 84 and/or processor 86 and/or radio interface 82 is configured to determine (Block S140) a numerology-independent measurement parameter for a channel occupancy measurement. The process also includes determining (Block S142) a channel occupancy measurement configuration based on the determined numerology-independent measurement parameter.

Figure 11:
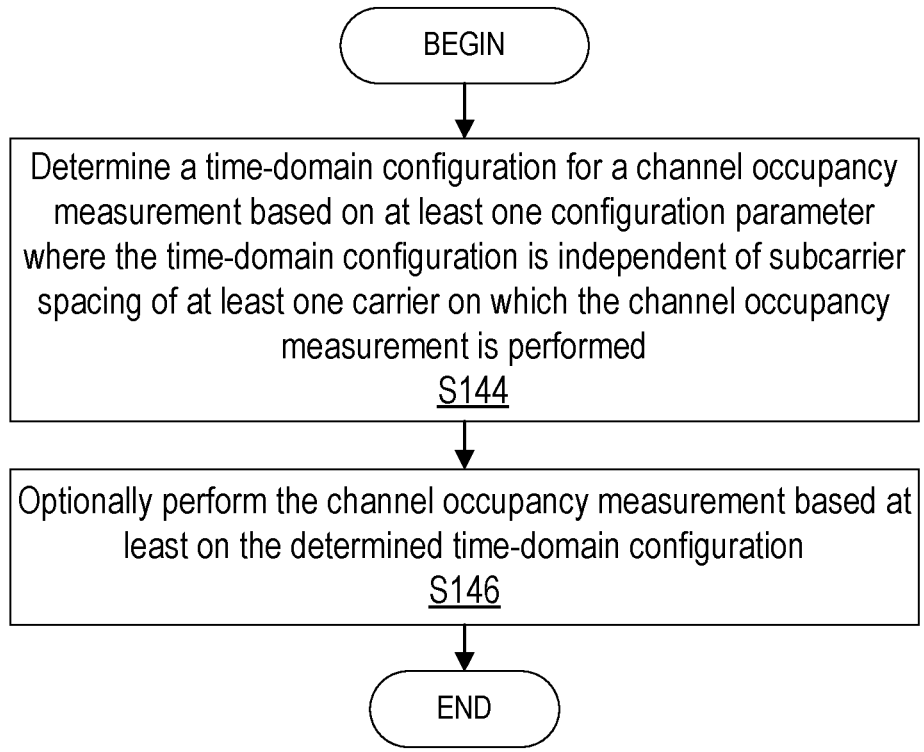
FIG. 11 is a flowchart of another example process in a wireless device according to some embodiments of the present disclosure.

FIG. 11 is a flowchart of an exemplary process in a wireless device 22 according to some embodiments of the present disclosure. One or more blocks described herein may be performed by one or more elements of wireless device 22 such as by one or more of processing circuitry 84 (including the parameter determiner unit 34), processor 86, radio interface 82 and/or communication interface 60. Wireless device 22 such as via processing circuitry 84 and/or processor 86 and/or radio interface 82 is configured to determine (Block S144) a time-domain configuration for a channel occupancy measurement based on at least one configuration parameter where the time-domain configuration is independent of subcarrier spacing of at least one carrier on which the channel occupancy measurement is performed, as described herein. Wireless device 22 such as via processing circuitry 84 and/or processor 86 and/or radio interface 82 is configured to optionally perform (Block S146) the channel occupancy measurement based at least on the determined time-domain configuration, as described herein.

According to one or more embodiments, the processing circuitry 84 is further configured to determine a frequency-domain configuration for the channel occupancy measurement based on the at least one configuration parameter where the frequency-domain configuration is independent of subcarrier spacing of at least one carrier on which the channel occupancy measurement is performed. The channel occupancy measurement is performed based at least on the determined frequency-domain configuration. According to one or more embodiments, the frequency-domain configuration indicates a frequency in a measurement bandwidth of the channel occupancy measurement. According to one or more embodiments, the indicated frequency in the of the measurement bandwidth corresponds to a center frequency of the measurement bandwidth.

According to one or more embodiments, the time-domain configuration indicates a measurement duration for the channel occupancy measurement. According to one or more embodiments, the at least one configuration parameter includes a reference numerology, the time-domain configuration is indicated in terms of a quantity of symbols based on the reference numerology. According to one or more embodiments, the time-domain configuration provides a granularity of measurement for the channel occupancy measurement.

According to one or more embodiments, the processing circuitry 84 is further configured to receive the at least one configuration parameter from a network node. According to one or more embodiments, the processing circuitry 84 is further configured to report the channel occupancy measurement, the channel measurement being a received signal strength indicator, RSSI, measurement. According to one or more embodiments, the RSSI measurement is scaled with a first bandwidth. According to one or more embodiments, the at least one configuration parameter is configured to be applied to at least one of multiple subband and bandwidth parts, BWPs.

Having described the general process flow of arrangements of the disclosure and having provided examples of hardware and software arrangements for implementing the processes and functions of the disclosure, the sections below provide details and examples of arrangements for methods for flexible configuration of channel occupancy measurements in New Radio.

The embodiments described herein may also be implemented in any combination.

According to one implementation:
  The need to perform a channel occupancy measurement (e.g., RSSI measurement) is determined by the WD 22 such as via one or more of processing circuitry 84, processor 86, radio interface 82, parameter determiner unit 34, etc., (e.g., based on a network configuration and/or a trigger);
  Upon the determined need, the WD 22, such as via one or more of processing circuitry 84, processor 86, radio interface 82, parameter determiner unit 34, etc., further determines (e.g., based on a pre-defined rule and/or based on a configuration from a network node 16) the time and/or frequency resources for the channel occupancy measurement according to one or any combination of the embodiments described herein;
  In some embodiments described herein, the WD 22, such as via one or more of processing circuitry 84, processor 86, radio interface 82, parameter determiner unit 34, etc., may also determine (e.g., based on a pre-defined rule and/or based on a configuration from a network node 16) a threshold (e.g., channelOccupancyThreshold) for performing the channel occupancy measurement;
  The WD 22, such as via one or more of processing circuitry 84, processor 86, radio interface 82, parameter determiner unit 34, etc., obtains one or more results based on the channel occupancy measurement in the determined time and/or frequency resources (the WD 22, such as via one or more of processing circuitry 84, processor 86, radio interface 82, parameter determiner unit 34, etc., may also use the determined threshold); and
  The WD 22, such as via one or more of processing circuitry 84, processor 86, radio interface 82, parameter determiner unit 34, etc., uses a result of the performed channel occupancy measurements for one or more operational tasks and/or reports it to a network node 16 (in a legacy way or according to the embodiments below).

Some examples of the WD 22 operational tasks include:
performing an LBT procedure or assisting another node in performing an LBT procedure in unlicensed or shared spectrum;
determining LBT configuration or category, determining COT configuration;
selecting and/or changing to or assisting a network node 16 in selecting and/or changing to the time and/or frequency resources (e.g., to a time- and/or frequency domain pattern, carrier frequency, cell, subband, bandwidth part (BWP), etc.) for WD 22 operation based on the channel occupancy result (e.g., choosing a least occupied carrier frequency to configure a serving cell or active BWP or subband); and/or
minimization of drive tests (MDT), self-organizing network (SON), collecting statistics of the channel occupancy during a time period such as part of a day, etc.

Embodiment #1: Numerology-Independent Time-Domain Configuration

In a first embodiment, WD 22 determines numerology-independent (e.g., sub-carrier spacing (SCS)-independent; as in independent of an active SCS on one or more carriers to be measured in the channel occupancy measurement) measurement duration for the channel occupancy measurement, e.g., based on a pre-defined rule and/or message or at least one configuration parameter received from a network node 16. In more general terms, the time-domain configuration (e.g. measurement duration) is independent of numerology (e.g., SCS, BWP) of the active/current numerology of carriers configured to be used by the wireless device 22 for channel occupancy measurement. The time-domain configuration may be, e.g., per carrier frequency, per frequency within a serving cell bandwidth or BWP, per BWP, per subband, etc. The time-domain configuration may be based on a reference numerology, as discussed below, such as a reference SCS. The reference SCS might be different from the SCS of the measurement resources, that is, the SCS of the carrier used on which the channel occupancy measurement is performed.

In one example, the channel occupancy measurement duration and/or offset within a subframe may comprise a fraction and/or multiple of a fixed-length time unit such as a fraction of 1 ms, of 1 subframe, etc. For example, the WD 22 may be configured with any of: 2, 1, ¼, ¼, ⅛, 1/14, etc. The WD 22 does not need to know the SCS of carriers being measured, e.g., in the NR slots (which may even vary by slots) to be able to perform the measurements.

Embodiment #2: Numerology-Independent Frequency-Domain Configuration

In a second embodiment, the WD 22 determines numerology-independent (e.g., SCS-independent) measurement bandwidth for the channel occupancy measurement, e.g., based on a pre-defined rule and/or message or at least one configuration parameter received from a network node 16. The configuration may be, e.g., per carrier frequency, per frequency within a serving cell bandwidth or BWP, per BWP, per subband, etc. In more general terms, the frequency-domain configuration (e.g. measurement bandwidth) is independent of numerology (e.g., SCS, BWP) of the active/current numerology of carriers configured to be used by the wireless device 22 for channel occupancy measurement. The frequency-domain configuration may be based on a reference numerology, as discussed below, such as a reference SCS. The reference SCS might be different from the SCS of the measurement resources, that is, the SCS of the carrier used on which the channel occupancy measurement is performed.

In one example, the channel occupancy measurement bandwidth may comprise an explicit configuration of N MHz, e.g., N=5 MHz, 10 MHz, 20 MHz, 40 MHz, or 80 MHz, etc. That is, in one or more embodiments, a configuration parameter configures a measurement bandwidth. The configurable values may also be configured by a multiple of a reference bandwidth, e.g., 10 MHz, 2×10 MHz, 4×10 MHz, etc., wherein 10 MHz is the reference bandwidth.

Embodiment #3 Channel Occupancy Measurement Configuration Reference

In a third embodiment, the WD 22 determines a channel occupancy measurement configuration by reference, wherein the reference may be pre-defined, determined based on a pre-defined rule, or configured based on a message or at least one configuration parameter received from a network node 16. The advantage of configuring by referencing are reduced overhead (e.g., no need to signal a configuration if not different from the reference) and reduced complexity (e.g., the WD 22 already knows or determines the configuration just once, for the reference configuration, and then applies this configuration to the channel occupancy measurement configuration). In more general terms, the reference may be independent of the active/current numerology of carriers configured to be used by the wireless device 22 for channel occupancy measurement such that it provides a reference for determining a channel occupancy measurement. The configuration may be, e.g., per carrier frequency, per frequency within a serving cell bandwidth or BWP, per BWP, per subband, etc.

In one example, the reference is a numerology reference usable to configure the channel occupancy measurement time and/or frequency resources (e.g., 30 kHz as a reference, i.e., 30 kHz SCS (reference SCS) for the channel measurement occupancy measurement may be pre-defined or signaled). In another example, the reference is the numerology of a reference channel or signal in a reference cell, reference BWP, or reference subband, e.g., synchronization signal block (SSB) or channel state information reference signal (CSI-RS) or transmission reference signal (TRS), on the carrier frequency configured for the channel occupancy measurement, even if the channel occupancy measurement may be performed in time and/or frequency resources different from the resources comprising the reference channel/signal (e.g., in subframes not comprising SSB or on a carrier frequency or BWP or subband without SSB). Further, the reference may be configured to provide and/or indicate and/or define a granularity of measurement that is independent of the actual/current/active SCS of the carriers to be measured.

In another example, the reference for a channel occupancy measurement configuration parameter may be the corresponding channel occupancy measurement configuration parameter in a reference (e.g., the currently active reference or reference indicated by a network node 16) BWP and/or subband. For example, the channel occupancy configuration parameter may be signaled to the WD 22 only if different from that in the reference, otherwise not signaled.

In another example, the reference for a channel occupancy measurement configuration parameter T in time domain is a known (to the WD 22) or pre-defined time reference T0, e.g.:
T0=SFNX (X=0) of a serving or reference cell (e.g., T=SFNX+delta_number of_subframes+[delta_number_of slots]+[delta_number_of symbols]); or
T0=the beginning of DRS window on a reference frequency (e.g., T=T0+offset); and/or
T0=the beginning of channel occupancy measurement duration on a reference frequency.

Embodiment #3a: Frequency-Domain Configuration Based on Reference Numerology

As a sub-embodiment to Embodiment #3, when the reference numerology is provided, the frequency-domain configuration can be in terms of physical resource blocks (PRBs). For example, if the reference numerology is 30 KHz (SCS), 51 PRBs would correspond to 18.26 MHz (the absolute measurement bandwidth is computed from N_RB and the reference SCS). The reference numerology can also be used to determine the frequency positions of PRBs determining the configured bandwidth for the channel occupancy measurement, e.g., the starting PRB and the last PRB of the configured bandwidth. In one or more embodiments, the reference numerology may be configured to provide and/or indicate and/or define a granularity of measurement that is independent of the actual/current/active numerology (e.g., SCS) of the carriers to be measured.

When configuring channel occupancy measurement over one or more subbands, the subbands can be defined as a certain PRB range each determined by a first PRB and the number of PRBs or by a first and last PRBs of the range (e.g., PRB1:PRB6 for subband 1, PRB7:PRB12 for subband2, PRB13:PRB16 for subband 3, etc.) assuming the reference SCS.

Embodiment #3b: Time-Domain Configuration Based on Reference Numerology

As a sub-embodiment to #3, when the reference numerology is provided, the time-domain configuration can be done in terms of symbols, based on this reference numerology. In one or more embodiments, at least one configuration parameter may indicate a number of symbols and a reference numerology for a channel occupancy measurement configuration. In other words, the WD can determine the time-domain configuration (e.g. measurement duration) from the configured reference numerology and configured number of symbols.

Embodiment #4: Channel Occupancy Measurement Configuration in Presence of Multiple Subbands and/or BWPs In a fourth embodiment, the channel occupancy measurement configuration may be configured for multiple subbands and/or BWPs, based on pre-defined rules, e.g., the same (e.g., reference) channel occupancy measurement configuration applies for all subbands.

In another example, a channel occupancy measurement configuration is signaled to/received by the WD 22 together with the associated configuration parameter (e.g., subband index or a pointer to a frequency of the subband such as the center frequency of the measurement bandwidth or an offset to a reference frequency (e.g., a serving carrier frequency, a frequency of an active BWP, a frequency of a reference subband, etc.) or a pointer to a resource block (RB) of the subband such as the first RB of the subband bandwidth) indicative of the corresponding subband.

Embodiment #5: The Frequency of the Channel Occupancy Measurement is Configured Separately from the ssbFrequency and refFreqCSI-RS According to this embodiment, the frequency of the RSSI and channel occupancy measurement are separate from the ssbFrequency and refFreqCSI-RS Information Elements, e.g., to allow the channel occupancy measurements on carrier frequency, frequency, subband, BWP, etc., without SSB and without CSI. The frequency of the channel occupancy measurement is used to determine the frequency location of the channel occupancy measurement. In one example, the frequency is the center frequency of the channel occupancy measurement bandwidth. In another example, the frequency is the frequency of a resource block (e.g., of the first RB) within the channel occupancy measurement bandwidth or the lowest frequency within the channel occupancy measurement bandwidth.

In a further example of this embodiment, the SCS and/or bandwidth or other configuration parameter for the channel occupancy measurements for the carrier frequency, frequency, subband, BWP, etc., without SSB and without CSI may be configured by reference, e.g., to a corresponding parameter associated with the ssbFrequency or refFreCSI-RS, while the frequency is different from ssbFrequency and refFreCSI-RS.

In a further example of this embodiment, the frequency of the channel occupancy measurement is a function of an ssbFrequency or refFreCSI-RS, e.g., ssbFrequency+delta*k, where k can be an integer (k=1 is a special case for which the frequency configured as ssbFrequency+delta) and may be configurable by a network node 16.

Embodiment #6: Reference Frequency Point and PRB Range

Instead of providing the center frequency as in Embodiment #5, another reference point, similar to Rel-15 Point A, is provided to the WD 22. In addition, a PRB range is provided to the WD 22. Based on this reference point and PRB frequency range, the WD 22 determines a frequency range for the RSSI and channel occupancy measurements.

Embodiment #7: Bandwidth Scaled Reporting Quantity

To maintain a constant reporting range independently of measurement bandwidth, the RSSI can be reported scaled with a fixed or configured bandwidth (e.g., 1 MHz or the minimum allowed bandwidth) and reported as e.g., dBm/MHz or dBm/X MHz. The receiving network node 16 may use the reported value as such or may convert to the original given the scaling factor is known to the WD 22 and to the network node 16. The scaling may be based on a pre-defined rule or configured by the network node 16.

Embodiment #8: A Channel Occupancy Threshold Based on One or any Combination of: Measurement Bandwidth, Reference Numerology, and Scaling Factor for the Reported Quantity In this embodiment, the channel occupancy threshold (e.g., such as channelOccupancyThreshold) may be determined (by WD 22 or network node 16 configuring then the WD 22) based on one or any combination of: measurement bandwidth, reference numerology, and scaling factor for the reported quantity, e.g., a first threshold may be configured for a first reference numerology and a second threshold may be configured for a second reference numerology.

In one example, a higher channel occupancy threshold is configured for a smaller SCS. In another example, a higher threshold may be configured for a smaller number of X MHz or for a smaller number of subcarrier or larger SCS (e.g., when the result of scaling is dBm per SCS or per MHz). In yet another example, a higher threshold is configured for a larger channel occupancy measurement bandwidth.

In another example, the same scaling factor is applied for the reported quantity and the threshold.

Methods in a Radio Network Node 16

Network node 16 embodiments are also presented. The network node 16 embodiments are as suggested in the WD 22 embodiments description above.

For example, a network node 16 may configure the WD 22 for channel occupancy measurements (the configuring may comprise configuring time and/or frequency resources for the measurements including frequency and bandwidth, a threshold usable for obtaining the channel occupancy measurement, measurement reporting quantity, or a rule usable to determine any of these, etc.) according to one or more embodiments via unicast/dedicated signaling, multicast, or broadcast (e.g., in the system information).

A channel occupancy measurement configuration determined based on the described embodiments may also be sent to another network node 16, e.g., via X2/Xn interface or at handover or via an interface between a core network node and radio network node (e.g., when a base station node obtains the measurement configured from a core network node such as SON or MDT node). The other network node 16 may be configured to adjust scheduling and/or perform another network node 16 action based on the received RSSI. That is, RSSI may be exchanged among one or more network node 16 for use by the respective network nodes 16.

The network node 16, such as for example via processing circuitry 68, may also determine one or more pre-defined rules used by the WD 22 for configuring and/or reporting the channel occupancy measurement and process the measurements accordingly. When jointly using channel occupancy measurements from different WDs or based on different measurement configuration, the network node 16 may also transform the measurements to a comparable basis, e.g., convert to and/or group them by quantities determined based on the same SCS, bandwidth, etc.

According to one aspect, a network node 16 is configured to communicate with a wireless device (WD 22). The network node 16 includes a radio interface 62 and/or processing circuitry 68 configured to: configure the WD 22 for channel occupancy measurements, the configuring including configuring time and/or frequency resources for the channel occupancy measurements.

According to this aspect, in some embodiments, the configuring of the WD 22 further includes configuring a threshold usable for obtaining the channel occupancy measurements.

According to another aspect, a method implemented in a network node 16 includes configuring, via the configuration unit 32, a wireless device, WD 22, for channel occupancy measurements, the configuring including configuring time and/or frequency resources for the channel occupancy measurements.

According to this aspect, in some embodiments, the configuring of the WD 22 further includes configuring a threshold usable for obtaining the channel occupancy measurements.

According to yet another aspect, a wireless device (WD 22) configured to communicate with a network node 16 is provided. The WD 22 includes a radio interface 82 and/or processing circuitry 84 configured to: determine a numerology-independent measurement parameter for a channel occupancy measurement and determine a channel occupancy measurement configuration based on the determined numerology-independent measurement parameter.

According to this aspect, in some embodiments, a numerology-independent measurement parameter is one of a duration and a bandwidth. In some embodiments, a channel occupancy measurement configuration is based on predefined rules and includes a configuration for multiple subbands. In some embodiments, a frequency of a received signal strength indicator, RSSI, and channel occupancy measurement are separate from ssbFrequency and refFreqCSI-RS Information Elements.

According to another aspect, a method implemented in a wireless device (WD 22) includes determining, via the parameter determiner unit 34, a numerology-independent measurement parameter for a channel occupancy measurement and determining a channel occupancy measurement configuration based on the determined numerology-independent measurement parameter.

According to this aspect, in some embodiments, a numerology-independent measurement parameter is one of a duration and a bandwidth. In some embodiments, a channel occupancy measurement configuration is based on predefined rules and includes a configuration for multiple subbands. In some embodiments, a frequency of a received signal strength indicator, RSSI, and channel occupancy measurement are separate from ssbFrequency and refFreqCSI-RS Information Elements.

SOME EXAMPLES

Example A1. A network node 16 configured to communicate with a wireless device 22 (WD 22), the network node 16 configured to, and/or comprising a radio interface 62 and/or comprising processing circuitry 68 configured to: configure the WD 22 for channel occupancy measurements, the configuring including configuring time and/or frequency resources for the channel occupancy measurements.

Example A2. The network node 16 of Example A1, wherein the configuring of the WD 22 further includes configuring a threshold usable for obtaining the channel occupancy measurements.

Example B1. A method implemented in a network node 16, the method comprising:
configuring a wireless device 22, WD 22, for channel occupancy measurements, the configuring including configuring time and/or frequency resources for the channel occupancy measurements.

Example B2. The method of Example B1, wherein the configuring of the WD 22 further includes configuring a threshold usable for obtaining the channel occupancy measurements.

Example C1. A wireless device 22 (WD 22) configured to communicate with a network node 16, the WD 22 configured to, and/or comprising a radio interface 82 and/or processing circuitry 84 configured to:
determine a numerology-independent measurement parameter for a channel occupancy measurement; and
determine a channel occupancy measurement configuration based on the determined numerology-independent measurement parameter.

Example C2. The WD 22 of Example C1, wherein a numerology-independent measurement parameter is one of a duration and a bandwidth.

Example C3. The WD 22 of Example C1, wherein a channel occupancy measurement configuration is based on predefined rules and includes a configuration for multiple subbands.

Example C4. The WD 22 of Example C1, wherein a frequency of a received signal strength indicator, RSSI, and channel occupancy measurement are separate from ssbFrequency and refFreqCSI-RS Information Elements.

Example D1. A method implemented in a wireless device 22 (WD 22), the method comprising:
determining a numerology-independent measurement parameter for a channel occupancy measurement; and
determining a channel occupancy measurement configuration based on the determined numerology-independent measurement parameter.

Example D2. The method of Example D1, wherein a numerology-independent measurement parameter is one of a duration and a bandwidth Example D3. The method of Example D1, wherein a channel occupancy measurement configuration is based on predefined rules and includes a configuration for multiple subbands.

Example D4. The method of Example D1, wherein a frequency of a received signal strength indicator, RSSI, and channel occupancy measurement are separate from ssbFrequency and refFreqCSI-RS Information Elements.

Some additional information is also provided as follows to illustrate how embodiments of the present disclosure might be incorporated into the 3GPP standards. The changes described are intended to illustrate how certain aspects of the present embodiments could be implemented in a particular standard. However, the present embodiments could also be implemented in other suitable manners, both in 3GPP specifications and in other specifications or standards.

INTRODUCTION

In RAN4 #91, a Way Forward on NR-U RRM was agreed in [1].
In this contribution, we discuss RSSI and channel occupancy measurements for NR-U. The related agreements in other groups are listed below.
RAN1 #96:
   At least the functionalities of Rel-13 LTE-LAA RSSI and channel occupancy reporting as a baseline should be supported
RAN2 #106:
   RSSI CO measurements are not used in Idle or Inactive in this release
   RSSI and CO measurement quantities can be reported with existing triggers as in LAA
   The reporting for RSSI and Channel Occupancy (CO) for NR-U is an optional UE capability as in LTE LAA
RAN2 #015-Bis:
   RSSI and Channel Occupancy configuration and reporting, in particular measurements over an interval (at least for CO) and periodical reporting, are used as a baseline for NR-U
UE RSSI and Channel Occupancy Measurements in LAA Vs. NR-U
In LTE, E-UTRA Received Signal Strength Indicator (RSSI) measurements were introduced for LAA and defined as the linear average of the total received power (in Watt) observed only in the configured OFDM symbols and in the measurement bandwidth over N resource blocks, by the UE from all sources, including co-channel serving and non-serving cells, adjacent channel interference, thermal noise etc.
Namely, the RSSI is configured (according to TS 36.331) by means of the following IE in MeasObjectEUTRA: rmtc-Period, rmtc-SubframeOffset, and measDuration, as shown below, so the UE performs RSSI measurements during measDuration only within RMTC occasions.

```
RMTC-Config-r13 ::= CHOICE {
    release                    NULL,
    setup                      SEQUENCE {
        rmtc-Period-r13        ENUMERATED {ms40,
ms80, ms160, ms320, ms640},
        rmtc-SubframeOffset-r13  INTEGER(0..639)
           OPTIONAL,           -- Need ON
        measDuration-r13       ENUMERATED {sym1,
sym14, sym28, sym42, sym70},
        ...
    }
}
```

One potential problem with RSSI and channel occupancy is that if the bandwidth is not clearly defined, preferably configured by the network to allow for some flexibility, there can be different UE implementations reporting the measurements based on different bandwidths.
   Observation 1: The UE needs to be aware of the RSSI and channel occupancy bandwidth, which should preferably be configurable.
Configuring the bandwidth in number of RBs requires the UE to also know the SCS which may vary by slots and among cells on the same carrier frequency. A similar problem is with the measurement duration, which is in LTE defined in number of symbols but the symbol length depends on SCS. So, a reference SCS for RSSI and channel occupancy measurements needs to be pre-defined or configured by the network. Alternatively, the measurement duration values may be defined, e.g., as fractions and multiples of a subframe, while the bandwidth values may be 5 MHz, 10 MHz, 20, MHz, etc. One should also note that the RSSI measurement by itself is the energy measurement which should not be strictly linked to any specific SCS configuration.
   Observation 2: Configuring the measurement duration and bandwidth shall be independent of the SCS used in the measurement resources, e.g., as fractions or multiples of a subframe and in MHz, respectively, or configured with respect to a reference SCS which may be different from the SCS of the measurement resources.
There can be carrier frequencies or parts of the spectrum without SSB configured. Furthermore, there should also be flexibility with respect to where to configure RSSI and channel occupancy measurements in time domain, to enable more efficient resource utilization in the entire system.
   Observation 3: RSSI and channel occupancy measurement resources shall not be limited to SSB time resources or SSB frequencies.
Another question that arises is that what is the reporting quantity for RSSI measurements and channel occupancy. Different options exist, e.g.,
   Option 1: UE reports the measured value, e.g., in dBm (like in LTE)
   Option 2: UE reports a normalized measured value independent on SCS, e.g., dBm per MHz
   Option 3: UE reports a normalized measured value based on SCS, e.g., dBm per SCS or per RB
Options 1 and 2 do not require knowing or configuring SCS for RSSI and channel occupancy measurements, while Option 3 has this dependency.
   Observation 4: Out of the options below, Option 1 (same in LTE) may be used, provided the measured bandwidth is known to the network:
      Option 1: UE reports the measured value, e.g., in dBm (like in LTE),
      Option 2: UE reports a normalized measured value independent on SCS, e.g., dBm per MHz,
      Option 3: UE reports a normalized measured value based on SCS, e.g., dBm per SCS or per RB.

SUMMARY

The following have been observed:
   Observation 1: The UE needs to be aware of the RSSI and channel occupancy bandwidth, which should preferably be configurable.
   Observation 2: Configuring the measurement duration and bandwidth shall be independent of the SCS used in the measurement resources, e.g., as fractions or multiples of a subframe and in MHz, respectively, or configured with respect to a reference SCS which may be different from the SCS of the measurement resources.
   Observation 3: RSSI and channel occupancy measurement resources shall not be limited to SSB time resources or SSB frequencies.
   Observation 4: Out of the options below, Option 1 (same in LTE) may be used, provided the measured bandwidth is known to the network:
      Option 1: UE reports the measured value, e.g., in dBm (like in LTE),
      Option 2: UE reports a normalized measured value independent on SCS, e.g., dBm per MHz,
      Option 3: UE reports a normalized measured value based on SCS, e.g., dBm per SCS or per RB.

Based on the observations above, a draft LS to RAN1/RAN2 was provided in R4-190xxxx, draft LS on RSSI and channel occupancy measurements in NR-U, Ericsson, August 2019.

Other observations include:

RAN4 has started discussions on RSSI and channel occupancy measurements in NR-U and has agreed on the following observations:

Observation 1A: The UE needs to be aware of the RSSI and channel occupancy bandwidth, which should preferably be configurable.

Observation 2A: Configuring the measurement duration and bandwidth shall be independent of the SCS used in the measurement resources, e.g., as fractions or multiples of a subframe and in MHz, respectively, or configured with respect to a reference SCS which may be different from the SCS of the measurement resources.

Observation 3A: RSSI and channel occupancy measurement resources shall not be limited to SSB time resources or SSB frequencies.

Observation 4A: Out of the options below, Option 1 (same in LTE) may be used, provided the measured bandwidth is known to the network:

Option 1: UE reports the measured value, e.g., in dBm (like in LTE),

Option 2: UE reports a normalized measured value independent on SCS, e.g., dBm per MHz, Option 3: UE reports a normalized measured value based on SCS, e.g., dBm per SCS or per RB.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

Abbreviation Explanation

ACK Acknowledged
BS Base station
BWP Bandwidth part
CE Control element
CORESET Control resource set
COT Channel Occupancy Time
CRS Cell-specific reference signals
CSI Channel state information
CSI-RS Channel state information reference signals
DCI Downlink control information
DL Downlink DRS Discovery reference signals
eLAA Enhanced LAA
FBE Frame Based Equipment
FDD Frequency division duplex
FR1 Frequency range 1
FR2 Frequency range 2
GC-PDCCH Group-common PDCCH
gNB Next generation Node B
HARQ Hybrid automatic repeat request
HSPA High speed packet access
LAA Licensed-Assisted Access
LBE Load Based Equipment
LBT Listen Before Talk
LTE Long term evolution
MAC Medium access control
MCOT Maximum COT
NACK Not acknowledged
NR New radio
NR-U NR unlicensed
OSI Other system information
PBCH Physical broadcast channel
PDCCH Physical downlink control channel
PDSCH Physical downlink shared channel
PSS Primary synchronization signal
PUCCH Physical uplink control channel
PUSCH Physical uplink shared channel
QCI Quasi co-location
RACH Random access channel
RAT Radio access technology
RMSI Remaining minimum system information
RRC Radio resource control
SCH Shared channel
SNR Signal to noise ratio
SRS Sounding reference signal
SSS Secondary synchronization signal
TCI Transmission configuration indicator
TDD Time division duplex
UCI Uplink control information
UE User equipment
UL Uplink
WCDMA Wide-band code division multiple access
WD Wireless Device It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented by a wireless device that is configured to communicate with a network node, the method comprising:
   receiving from the network node at least one configuration parameter for a channel occupancy measurement;
   determining a measurement duration for the channel occupancy measurement based on at least one configuration parameter, the measurement duration being independent of a subcarrier spacing for time-frequency resources in which the channel occupancy measurement is performed; and
   performing the channel occupancy measurement based at least on the determined measurement duration.

2. The method of claim 1, further comprising determining a frequency-domain configuration for the channel occupancy measurement based on the at least one configuration parameter, the frequency-domain configuration being independent of subcarrier spacing for time-frequency resources in which the channel occupancy measurement is performed; and
   performing the channel occupancy measurement additionally based at least on the determined frequency-domain configuration.

3. The method of claim 2, wherein the frequency-domain configuration is a measurement bandwidth of the channel occupancy measurement.

4. The method of claim 2, wherein the at least one configuration parameter comprises a center frequency of a measurement bandwidth.

5. The method of claim 1, wherein the at least one configuration parameter comprises a reference sub-carrier spacing and a quantity of symbols.

6. The method of claim 1, further comprising reporting the channel occupancy measurement.

7. The method of claim 1, wherein the channel occupancy measurement is a received signal strength indicator (RSSI) measurement, and the RSSI measurement is scaled with a first bandwidth.

8. The method of claim 1, wherein the at least one configuration parameter is configured to be applied to at least one of multiple subband and bandwidth parts, BWPs of a serving cell provided by the network node.

9. The method of claim 1, wherein the at least one configuration parameter is received separately from a synchronization signal block (SSB) frequency information element ssbFrequency and a channel state information reference signal (CSI-RS) frequency information element refFreqCSI-RS.

10. A method implemented by a network node that is configured to communicate with a wireless device, the method comprising:
    causing transmission of at least one configuration parameter for a channel occupancy measurement that is configured to indicate a measurement duration for the channel occupancy measurement, the measurement duration being independent of subcarrier spacing for time-frequency resources in which the channel occupancy measurement is performed.

11. The method of claim 10, further comprising receiving the channel occupancy measurement that is associated with the at least one configuration parameter.

12. The method of claim 10, wherein the at least one configuration parameter is further configured to indicate a frequency-domain configuration for the channel occupancy measurement, the frequency-domain configuration being independent of subcarrier spacing for time-frequency resources in which the channel occupancy measurement is performed.

13. The method of claim 12, wherein the frequency-domain configuration is a measurement bandwidth of the channel occupancy measurement.

14. The method of claim 13, wherein the at least one configuration parameter comprises a center frequency of the measurement bandwidth.

15. The method of claim 10, wherein the at least one configuration parameter comprises a reference sub-carrier spacing and a quantity of symbols for the measurement duration.

16. The method of claim 10, wherein the channel measurement is a received signal strength indicator, RSSI, measurement.

17. The method of claim 16, wherein the RSSI measurement is scaled with a first bandwidth.

18. The method of claim 10, wherein the at least one configuration parameter applies to at least one of multiple subband and bandwidth parts, BWPs of a serving cell provided by the network node.

19. The method of claim 10, wherein the at least one configuration parameter is transmitted separately from a synchronization signal block (SSB) frequency information element ssbFrequency and a channel state information reference signal (CSI-RS) frequency information element refFreqCSI-RS.

20. The method of claim 10, further comprising:
 receiving a neighbor channel occupancy measurement from another network node; and
 adjusting scheduling associated with the wireless device based on the neighbor channel occupancy measurement.

\* \* \* \* \*

UNITED STATES PATENT AND TRADEMARK OFFICE
CERTIFICATE OF CORRECTION

PATENT NO. : 12,167,376 B2
APPLICATION NO. : 17/635630
DATED : December 10, 2024
INVENTOR(S) : Siomina et al.

It is certified that error appears in the above-identified patent and that said Letters Patent is hereby corrected as shown below:

In the Specification

In Column 3, Line 46, delete "reportInterval" and insert -- reportInterval, --, therefor.

In Column 4, Line 47, delete "the of the" and insert -- the --, therefor.

In Column 5, Line 28, delete "the of the" and insert -- the --, therefor.

In Column 6, Line 9, delete "the of the" and insert -- the --, therefor.

In Column 6, Lines 54-55, delete "the of the" and insert -- the --, therefor.

In Column 8, Line 51, delete "(RRU) Remote" and insert -- (RRU), Remote --, therefor.

In Column 9, Line 5, delete "equipped" and insert -- equipment --, therefor.

In Column 9, Line 16, delete "(RRU) Remote" and insert -- (RRU), Remote --, therefor.

In Column 9, Line 55, delete "equipped" and insert -- equipment --, therefor.

In Column 13, Line 19, delete "and or" and insert -- and/or --, therefor.

In Column 18, Line 16, delete "the of the" and insert -- the --, therefor.

In Column 19, Line 21, delete "the of the" and insert -- the --, therefor.

In Column 21, Line 5, delete "1/4, 1/4, 1/8, 1/14," and insert -- 1/2, 1/4, 1/8, 1/14, --, therefor.

In Column 22, Line 28, delete "[delta_number_of_symbols]); or" and insert

Signed and Sealed this
Thirteenth Day of May, 2025

Coke Morgan Stewart
*Acting Director of the United States Patent and Trademark Office*

-- [delta_number_of_symbols]); or --, therefor.

In Column 26, Line 50, delete "bandwidth" and insert -- bandwidth. --, therefor.